Sept. 23, 1952  J. E. STORMENT  2,611,576
POSITIVE CLOSURE PLUG VALVE
Filed April 23, 1945
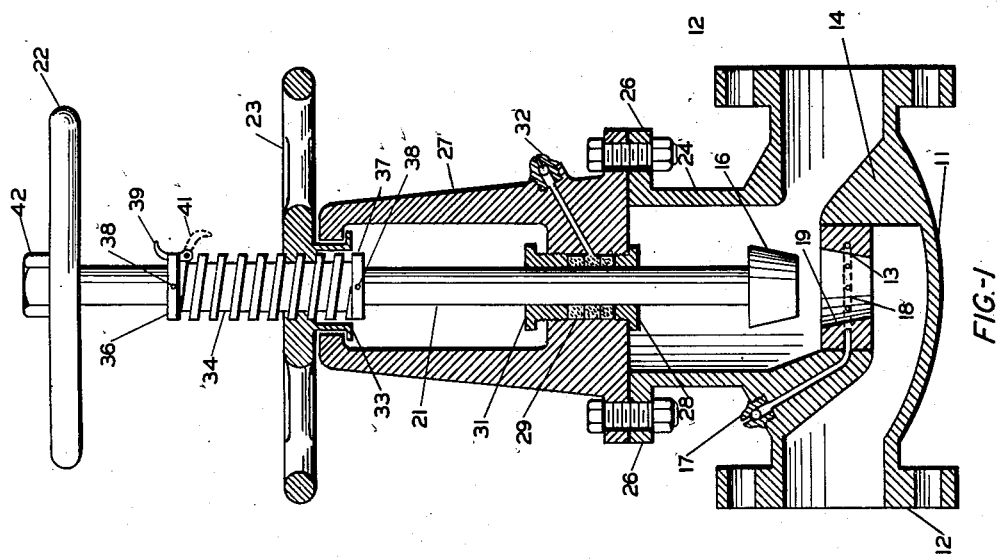
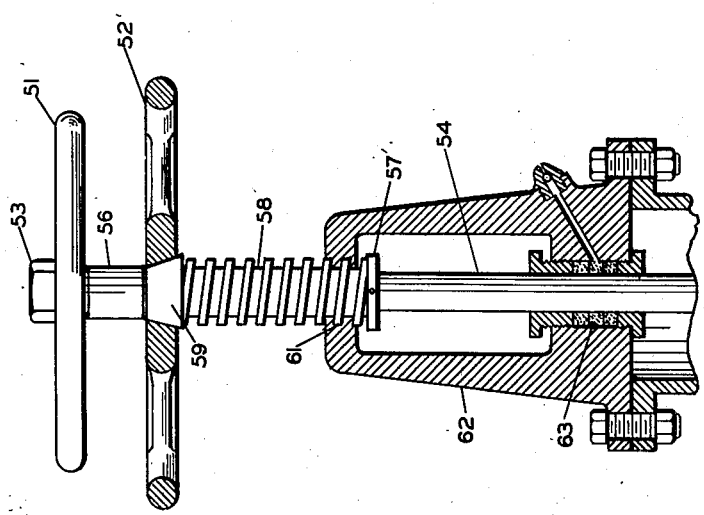
INVENTOR
JOSEPH E. STORMENT
BY Hudson & Young
ATTORNEYS Patented Sept. 23, 1952

2,611,576

UNITED STATES PATENT OFFICE 2,611,576

POSITIVE CLOSURE PLUG VALVE

Joseph E. Storment, Bartlesville, Okla., assignor to Phillips Petroleum Company, a corporation of Delaware Application April 23, 1945, Serial No. 589,767

4 Claims. (Cl. 251—20)

This invention relates to valves. In one of its more specific aspects it relates to positive closure plug valves for use under corrosive conditions.

In many chemical manufacturing and petroleum refining applications corrosive liquids and/or gases are processed at atmospheric and/or at higher temperatures. For example, hydrofluoric acid alkylation operations entail transfer of hydrocarbon materials and hydrogen fluoride or hydrofluoric acid. Transfers may be in the vapor phase, liquid phase or a mixture of the two phases. Temperatures may be substantially atmospheric or considerably higher. Whatever the operating conditions when processing chemicals like hydrogen fluoride corrosion of such equipment as stills, fractionators, heat exchangers, pipes and valves is apparent. For example, in plug or stopcock type valves, the plug and seat faces may become corroded and pitted and finally fail to stop completely the flow of fluids when in a "closed" position. Then again, especially if corrosion of surfaces has already begun, such valves may be frozen open or closed when permitted to remain in the corresponding position for a period of time. It is customary practice to turn such a valve at intervals to assist in preventing such freezing. This procedure, however, was apparently not the solution of the problem.

An important point in this connection is the use of a proper valve lubricant. Another point is the method or means of applying the lubricant to the valve surfaces while the valve is in service. A good lubricant improperly or incompletely applied to active valve surfaces will cause valve failure under many conditions. Thus, it will be obvious to those skilled in the valve art or in chemical manufacturing art that any one or combination of more than one of such reasons may contribute to valve failure.

I am particularly interested in valves and in their operation for use in hydrofluoric acid alkylation plants manufacturing high octane number aviation gasolines or blending stocks therefor.

Accordingly, one object of my invention is to provide a valve for use in situations where the valve head tends to become stuck on the seat and to provide means for obviating such sticking, or reducing the tendency to stick.

Another object of my invention is to provide a plug type valve for use in hydrofluoric acid alkylation plants.

Yet another object of my invention is to provide a plug type which is so constructed as to permit effective lubrication of the plug with respect to the seat for use in hydrofluoric acid alkylation plants or in other chemical manufacturing plants.

Numerous other objects and advantages will be apparent to those skilled in such art from a careful study of the following disclosure, in which:

Figure 1 shows diagrammatically one form of plug type valve embodying my invention, and Figure 2 shows diagrammatically a second form of plug type valve embodying the structure and advantages of my invention.

Referring to the drawing, and specifically to Figure 1, numeral 11 refers to a valve housing having two conventional flanged ends 12. Within the housing is a valve seat 13 and a valve seat supporting means 14 which are conventional members of globe type valves. The seat is rigidly fixed to the seat support so that the seat member cannot be moved either up or down or rotated through contact with a valve head 16, shown as a plug type head for purposes of illustration.

The valve housing 11 carries a standard lubricator device 17 which communicates with a grease channel 18 in the valve seat. This channel has numerous outlets to the conical surface 19 through which lubricant can be forced to contact the valve plug 16.

The valve plug 16 is supported movably by a valve stem or shaft 21. The plug, however, may not be "rigidly" fixed to the valve stem, but should be attached in such a manner that when the shaft is rotated by a hand wheel 22 the plug also rotates, and when the valve stem is raised or lowered, as by rotation of a hand wheel 23, the plug also is raised or lowered. The detailed operation of the hand wheels and valve plug will be explained in detail hereinafter. A side arm portion 24 of the housing carries a flange 26 to which a bonnet member 27 is bolted. This bonnet member carries a packing gland assembly composed of a bushing 28, rings of packing material 29, a second bushing 31, and a lubrication means 32. This packing assembly is of conventional and well known design.

The upper or hand wheel end of the bonnet member is machined to carry a bushing member 33 which is in turn rigidly attached to the lower of two hand wheels. This lower hand wheel 23 is threaded and said threads mesh with the exterior or male threads of a threaded stem sleeve 34. Adjacent this threaded sleeve are a top sleeve stop 36 and a bottom sleeve stop 37. These sleeve stops are rigidly pinned by pins 38 to the valve stem 21. The threaded stem sleeve 34 is free to rotate axially with respect to said valve stem when a thumb key 39 is placed in an "open" position as indicated by the dotted position of the thumb key referred to by numeral 41. When the thumb key is in the position indicated by numeral 39, then the threaded stem sleeve 34 is fixed rigidly to the valve stem, since the upper sleeve stop contains a small vertically disposed slot into which said thumb key 39 fits. In addition the upper portion of the threaded stem sleeve 34 carries a small vertical slot and pivot pin or other means of fastening the thumb key 39. This thumb key arrangement is intended to be of such type that when opened or closed it will remain definitely in such position so that an operator working in the winter time with gloves on the hands will have no difficulty in making certain that the key when opened will stay open, or when closed will stay closed. Such a means might be a spring-type thumb key, such being an article of commerce.

The upper hand wheel, sometimes termed a "stem wheel," and identified by the reference numeral 22, has a square opening in its center through which the squared upper end of the valve stem protrudes. A nut 42 holds this upper hand wheel rigidly in place.

In the operation of this valve of Figure 1, when thumb key 39 is open (as indicated by the dotted key 41) the hand wheel 22, valve stem 21 and valve plug 16 are free to rotate, or in other words by turning this hand wheel the valve plug rotates. Then upon closing the thumb key 39 and upon rotation of hand wheel 23 only, the valve plug rises or lowers depending upon the direction of rotation of this hand wheel and without rotation of the valve plug 16. Then also with the thumb key in the closed position (39) upon rotation of the valve stem wheel 22 (wheel 23 remaining stationary) the valve plug raises or lowers and at the same time rotates. This last operation may in many installations be seldom used.

If the valve plug is to be lubricated, for example, starting from a "closed" position, first, close thumb key into position indicated by numeral 39, turn wheel 23 slightly to raise the valve plug just off its seating surface 19, then with a pressure lubricating gun or other means inject lubricant into lubricator 17 thence into grease channel 18, and upon continued injection of lubricant same will extrude through the hereinbefore mentioned "outlets" from said grease channel 18 to the valve seat surface 19. Then open thumb key into position 41 and rotate hand wheel 22. The valve plug 16 also rotates and causes lubricant from said grease channel to become well spread upon the seat surface 19 and the surface of the plug 16. When these two surfaces are well lubricated, the thumb key should be closed to the 39 position and the valve lowered or closed by a slight turn of wheel 23 in the proper direction.

To open this valve without simultaneous rotation of the plug, merely place the thumb key in the 39 position and turn hand wheel 23 in the proper direction, which direction will be determined by whether the threads on the threaded stem sleeve and hand wheel 23 are right or left handed. When these threads are left-handed threads the valve will open upon turning the hand wheel 23 to the left. To close the valve from an "open" position merely have the thumb key closed and turn the hand wheel 23 to the right. In these operations for opening and closing the valve without rotation of the valve plug, there may be sufficient drag or friction between the packing 29 and the valve stem 21 to prevent said rotation. However, if there should not be sufficient friction, then the hand wheel 22 should be held stationary while rotating wheel 23 to open or close the valve. For rotation of the valve plug, the threaded stem sleeve 34 is so made as to rotate freely on the valve stem or conversely the valve stem will rotate freely within this sleeve member so that upon rotation of the wheel 22 and valve plug there will be no tendency whatever to raise or lower the plug.

Still another condition of operation may occur and that is to rotate both hand wheels in the same direction and at the same rate. Under such conditions the valve plug will merely rotate, regardless of the direction of rotation.

A second embodiment of my valve will be evident upon reference to Figure 2 of the drawing. Hand wheels 51 and 52 are similar to the corresponding hand wheels 22 and 23 of the other valve mechanism. The hand wheel 51 is mounted on the upper squared end of a valve stem 54, and held in place by a nut 53 in a conventional manner. Collar or sleeve 56 is for the sole purpose of keeping the two hand wheels separated by a definite minimum distance, while a sleeve stop 57 pinned to the valve stem 54 serves to prevent downward movement of a threaded stem sleeve 58 and hand wheel 52. Thus the nut 53 prevents any or all parts of this assembly, that is, the two hand wheels, sleeve 56 and threaded sleeve 58 from any upward movement with respect to the valve stem, while the sleeve stop 57 prevents any downward movement of these parts with respect to the valve stem.

The hand wheel 52 has an opening in its center. This opening may be square in outline or a hexagon or other shape such that when fit over a complementary member 59 the wheel or said member 59 cannot rotate one without the other. The square or hex complementary member 59 is an integral part of the threaded stem sleeve. These two parts may be made together from one piece of metal or may be made separately and from individual pieces of metal and rigidly attached to one another subsequently so that they operate on the valve stem as one rigid member. Thus when the hand wheel 52 is rotated in either direction the threaded sleeve member 58 is intended to follow this wheel rotation. This member 58—59 is hollow and properly machined so that it rotates freely with respect to the valve stem 54. As mentioned above, the sleeve stop 57 prevents downward movement of this member 58—59 with respect to the valve stem.

The upper portion 61 of the valve bonnet 62 is threaded to mesh with the threads of the threaded stem sleeve 58, so that when hand wheel 52 is rotated the entire valve-stem-wheel assembly moves upward or downward with respect to the valve seat, not shown in Figure 2.

The operation of this valve embodiment is very simple and positive. Upon rotating wheel 51 the valve stem 54 and plug (not shown) rotate regardless of the position of the valve plug with respect to its seat. In a similar manner, upon rotation of hand wheel 52 the valve plug is raised or lowered without rotation. There is ordinarily sufficient drag or friction due to packing 63 to prevent rotation of the plug during opening or closing operations. However, if ever this should not be the case all that is necessary to prevent plug rotation during opening or closing is merely to hold with one hand the wheel 51 while rotating the other wheel. Furthermore it is ordinarily immaterial whether or not the plug rotates during the opening or closing operation, and accordingly hand wheel 51 is seldom held rigid while turning wheel 52 to open or close the valve.

For lubricating the valve plug face and seat, the method is substantially the same as described hereinbefore for the valve of Figure 1. It is merely necessary to turn the hand wheel 52 very slightly to raise the plug just off its seat, then inject lubricant through a lubricator similar to lubricator 17 of Figure 1, whence the lubricant passes into and through grease channels (like 18 of Fig 1) and to the face of the seat and plug. Then upon rotation of the hand wheel 51 the grease is spread over the plug-seat surfaces, and the plug may then be lowered to close the valve or opened to permit flow of fluid as desired.

It might be mentioned that the lubricator 17 (for use in both valves, for valve seats and packing) is of standard design. The type I consider satisfactory contains a ball check valve, since the lubrication of the valve seat and plug is against line operating pressure. The lubricators for the packing glands should preferably be of the same simple type.

The materials of construction of these valves may be selected from among those commercially available as best suited for the particular purpose at hand. For example, non-corrosive metal should be used in valve construction where corrosion might occur, as in hydrofluoric acid alkylation service, or aluminum chloride service, or other acid or even alkaline services. Regardless of the metals used in construction of the valve parts adjacent corrosive materials, the principles of my invention are broad and have wide application for plug type valves. The dimensions or proportions of a plug and/or seat may vary considerably and still be suitable for the application of my invention.

In my valve mechanism, the invention is of broad application since it may be used on a type of valve as shown in the drawing, that is, a valve in which the plug and valve stem move at right angles to the direction of flow of fluid, or the valve may be a Y-type valve in which the plug and stem move to close and open the valve in a direction at an angle other than a right angle to the general direction of fluid flow. In addition, it may be used on a 90 degree valve in which said direction of plug and stem movement may be in line with one of the arms of the valve housing, or, on other types of valves applicable to the use of my invention.

The specific shape of head 16 may be varied widely without departing from the invention, and while I prefer the conical plug shown, the head 16 may in some instances be a flat plate, sphere or pseudosphere or portion thereof, a hollow cone, or other shape and still gain beneficial results from my invention, as it will be obvious that various changes in the arrangement and construction of parts may be made within the scope of the invention which is defined by the following claims.

Having thus described my invention, I claim:

1. A lubricated valve comprising in combination a body having a conduit therethrough, a valve seat in said conduit, a valve plug disposed in said conduit for movement to and from said seat whereby fluid flow through said conduit is controlled, a housing bonnet attached to said body, means to supply lubricant to said seat, means to move said plug to and from said seat comprising a valve stem attached at one end to said plug, an elongated, exteriorly threaded hollow member surrounding said valve stem and being rotatably free and longitudinally fixed as regards movements on said valve stem, a manually operated means for rotatably fixing said elongated hollow member to said valve stem and a manually operated rotatable means in threaded relation to said elongated, exteriorly threaded hollow member and rotatably free with respect to said bonnet whereby upon rotation of said manually operated rotatable means said valve plug moves to or from said seat without rotation; means for rotating said plug comprising a second manually operated rotatable means rigidly fixed to the valve stem at the opposite end from said plug whereby upon rotation of said second manually operated rotatable means said plug rotates.

2. In a valve mechanism consisting of a housing having a conduit therethrough and having a valve seat, a plug type closure member supported by one end of a valve stem and arranged to act in fixed relation to the valve seat to open and to close said valve mechanism to the flow of fluids therethrough, the improvement comprising in combination a hollow cylindrical member surrounding said valve stem near the end opposite said closure member, said hollow cylindrical member threaded on its exterior surface and adapted to rotate freely with respect to said valve stem without longitudinal movement thereon and further adapted to be rotatably fixed to said valve stem, means for rotating said valve stem and means for rotating said hollow cylindrical threaded member.

3. In the valve mechanism of claim 2 wherein the valve housing contains means for applying lubricant to the valve seat.

4. A valve comprising, in combination, a valve bonnet having a seat formed therein, a valve stem journalled for longitudinal and rotary movement in said bonnet, a valve head secured to one end of said stem and engageable with said seat, an exteriorly threaded sleeve rotatably mounted on said stem, a pair of collars formed on said stem and engageable with said sleeve to prevent longitudinal movement of the sleeve with respect to the stem, a latch for releasably securing said sleeve to said stem, a first handwheel carried by said stem, and a second handwheel journalled in said bonnet, said second handwheel having a threaded section interiorly of its hub which is complementary with the threaded portion of said sleeve.

JOSEPH E. STORMENT.

REFERENCES CITED

The following references are of record in the file of this patent:

UNITED STATES PATENTS

| Number | Name | Date |
| --- | --- | --- |
| 1,404,103 | Eckenroth | Jan. 17, 1922 |
| 1,604,944 | Nordstrom | Oct. 26, 1926 |
| 1,991,621 | Noll | Feb. 19, 1935 |
| 2,114,934 | Nordstrom | Apr. 19, 1938 |

FOREIGN PATENTS

| Number | Country | Date |
| --- | --- | --- |
| 231,340 | Great Britain | of 1925 |